(12) United States Patent
Kim et al.

(10) Patent No.: US 7,479,874 B2
(45) Date of Patent: Jan. 20, 2009

(54) VERIFICATION OF SINGULATED RFID TAGS BY RFID READERS

(75) Inventors: Seok Ho Kim, North Potomac, MD (US); Mohammad Soleimani, Gaithersburg, MD (US); Jens Arnold, Perry Hall, MD (US); Victor H. Molina, Germantown, MD (US)

(73) Assignee: Symbol Technologies, Holtsville, NY (US)

( * ) Notice: Subject to any disclaimer, the term of this patent is extended or adjusted under 35 U.S.C. 154(b) by 205 days.

(21) Appl. No.: 11/412,840

(22) Filed: Apr. 28, 2006

(65) Prior Publication Data

US 2007/0257776 A1 Nov. 8, 2007

(51) Int. Cl.
*B60Q 1/00* (2006.01)
(52) U.S. Cl. .................. 340/450; 340/10.31; 235/375
(58) Field of Classification Search .......... 340/450, 340/572.1, 572.7, 10.1, 10.2, 10.3, 10.31; 235/375
See application file for complete search history.

(56) References Cited

U.S. PATENT DOCUMENTS

| | | | |
|---|---|---|---|
| 5,995,019 A | 11/1999 | Chieu et al. | |
| 6,107,910 A | 8/2000 | Nysen | |
| 6,433,671 B1 | 8/2002 | Nysen | |
| 6,531,957 B1 | 3/2003 | Nysen | |
| 6,580,358 B1 | 6/2003 | Nysen | |
| 6,950,009 B1 | 9/2005 | Nysen | |
| 6,970,070 B2 * | 11/2005 | Juels et al. | 340/10.1 |
| 7,187,267 B2 * | 3/2007 | Cole | 340/10.1 |
| 7,187,293 B2 * | 3/2007 | White et al. | 340/572.8 |
| 7,195,173 B2 * | 3/2007 | Powell et al. | 235/375 |
| 7,245,213 B1 * | 7/2007 | Esterberg et al. | 340/10.3 |
| 2005/0058292 A1 * | 3/2005 | Diorio et al. | 380/270 |
| 2006/0214773 A1 * | 9/2006 | Wagner et al. | 340/10.2 |
| 2006/0284727 A1 * | 12/2006 | Steinke | 340/10.31 |

* cited by examiner

*Primary Examiner*—John A Tweel, Jr.

(57) ABSTRACT

Methods, systems, and apparatuses for verifying singulated tags are described. A radio frequency (RF) signal is transmitted to provide power to at least one tag. A powered tag is singulated. A delay time period is waited. A read verify command is transmitted to the singulated tag. A response is received to the read verify command. The response to the read verify command is verified to determine whether it was received from the singulated tag.

23 Claims, 8 Drawing Sheets

1100

1102 the singulated tag is disregarded if the identification number received from the singulated tag in response to the read verify command does not match the identification number received in response to the singulation command

1104 the singulated tag is accepted if the identification number received from the singluated tag in response to the read verify command matches the identification number received in response to the singulation command

FIG. 11

VERIFICATION OF SINGULATED RFID TAGS BY RFID READERS

BACKGROUND OF THE INVENTION

1. Field of the Invention

The invention relates to radio frequency identification (RFID) technology, and in particular, to verifying RFID tags singulated by RFID readers.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Because the reader "interrogates" RFID tags, and receives signals back from the tags in response to the interrogation, the reader is sometimes termed as "reader interrogator" or simply "interrogator."

With the maturation of RFID technology, efficient communication between tags and interrogators has become a key enabler in supply chain management, especially in manufacturing, shipping, and retail industries, as well as in building security installations, healthcare facilities, libraries, airports, warehouses, etc.

In a relatively dense reader environment, the possibility exists that a signal from a RFID tag will be sensed not only by the nearby reader powering the tag, but also by a second reader that is physically positioned far away from the tag. Although the second reader does not power the tag, it still may be able to receive a response from the tag. This phenomenon is called a "cross-read" of the tag, where a reader reads a tag located outside a range of its transmitter. Such cross-reads are undesirable in certain situations. For example, if the second reader reads the tag being powered by the first reader, the determined location of the tag may be incorrect.

Cross-read events can be mitigated by implementing a proper physical layout of RFID system components, and by proper configuration of RF parameters. However, despite this, some non-negligible cross-reads tend to occur over time.

Thus, what is needed are ways to improve a quality of communications between readers and tags in an RFID communications environment, such as a warehouse environment, to improve tag read rates and to avoid cross-reads of tags.

BRIEF SUMMARY OF THE INVENTION

Methods, systems, and apparatuses for reducing cross-reads of tags by readers are described. In an aspect, nearby readers that are synchronized in their attempts to singulate tags, and may therefore suffer cross-reads of tags, are moved out of synchronization to avoid cross-reads.

In an aspect of the present invention, tags singulated by readers are verified. A radio frequency (RF) signal is transmitted to provide power to at least one tag. A powered tag is singulated. A delay time period is waited. A read verify command is transmitted to the singulated tag. A response is received to the read verify command. The response to the read verify command is verified to determine whether it was received from the singulated tag.

In another aspect of the present invention, a RFID reader is described. The reader includes an antenna and logic. The logic includes a tag power module, a tag singulate module, and a read verify module. The tag power module is configured to cause the reader to transmit a radio frequency (RF) signal from the antenna to provide power to one or more tags. The tag singulate module is configured to transmit a singulate command from the antenna to singulate a powered tag. The read verify module is configured to transmit a read verify command to the singulated tag after a delay time period. The read verify module is further configured to verify that a response received to the read verify command was received from the singulated tag.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 11 shows details of a tag verification process, according to an example embodiment of the present invention.

Figure 1:
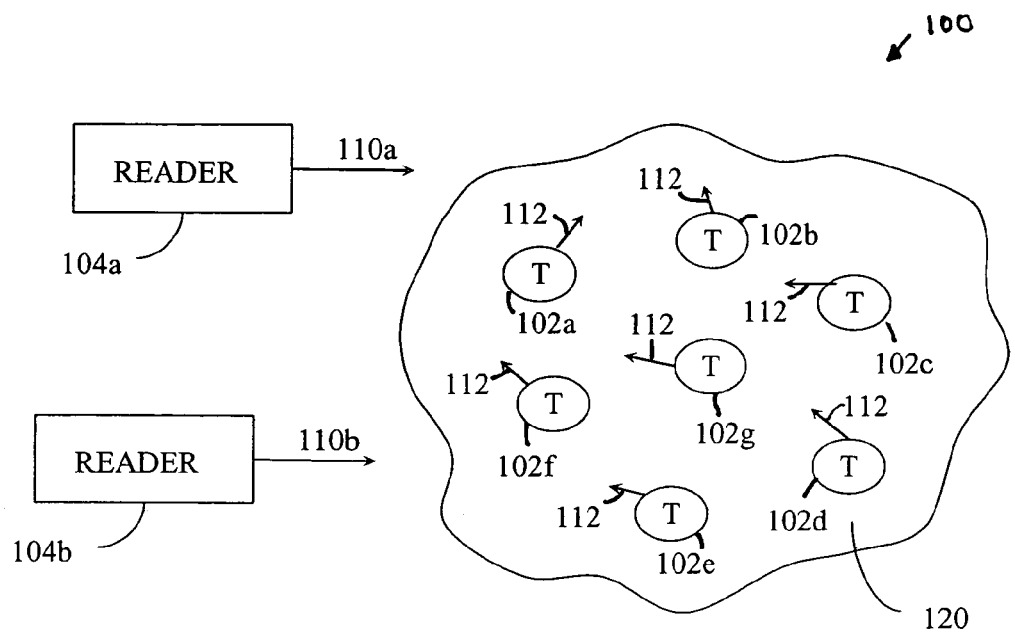
FIG. 1 shows an environment where RFID readers communicate with an exemplary population of RFID tags.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

Methods, systems, and apparatuses for RFID readers are described herein. In particular, methods, systems, and apparatuses for verifying singulated tags, and for reducing cross-reads of tags by readers, are described. According to embodiments of the present invention, readers that are synchronized in their attempts to singulate tags, and may thus suffer cross-reads of tags, are moved out of synchronization to avoid cross-reads.

According to embodiments, singulated tags are verified. A radio frequency (RF) signal is transmitted to provide power to at least one tag. A powered tag is singulated. A delay time period is waited. A read verify command is transmitted to the singulated tag. A response is received to the read verify command. The response to the read verify command is verified to determine whether it was received from the singulated tag.

The present specification discloses one or more embodiments that incorporate the features of the invention. The disclosed embodiments merely exemplify the invention. The scope of the invention is not limited to the disclosed embodiments. The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System Embodiment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110a having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
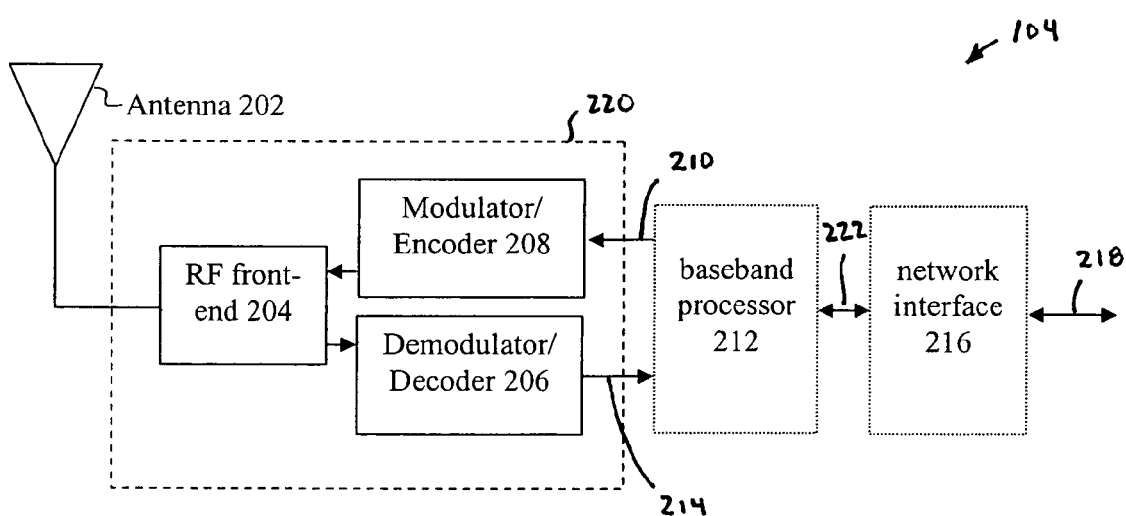
FIG. 2 shows a block diagram of an RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, such as one of pulse-interval encoding (PIE), FM0, or Miller encoding formats, modulates the encoded signal, and outputs the modulated encoded interrogation signal to RF front-end 204.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

As further described below, according to embodiments of the present invention, a reader is configured to verify read tags. These embodiments and further embodiments of the present invention are described in further detail below. Such embodiments may be implemented in the environments, readers, and tags described above, and/or in alternative environments and alternative RFID devices, as would be apparent to persons skilled in the relevant art(s).

Example Reader Embodiments and Mobile Structure Environments

Embodiments are described herein for verifying tags that are read by a reader. These embodiments can be implemented anywhere that readers and tags are used. For example, embodiments can be implemented in a commercial or industrial environment, such as in a warehouse, a factory, a business, a store, an airport baggage handling area, parallel conveyor belts in distribution centers, and in a military or other non-commercial environment. Embodiments can be implemented in all size environments, including environments having space limitations, and where RF shielding between reader zones is not practical or is not completely effective.

In a relatively dense reader environment, the possibility exists that a signal from a RFID tag will be received not only by a first reader that powers the tag, but also by a second reader that is physically positioned far away from the tag. This phenomenon is called a "cross-read" of the tag, where a reader (e.g., the second reader) reads a tag that it did not power. Such cross-reads are undesirable in certain situations, making the determined locations of tags to be uncertain.

Figure 3:
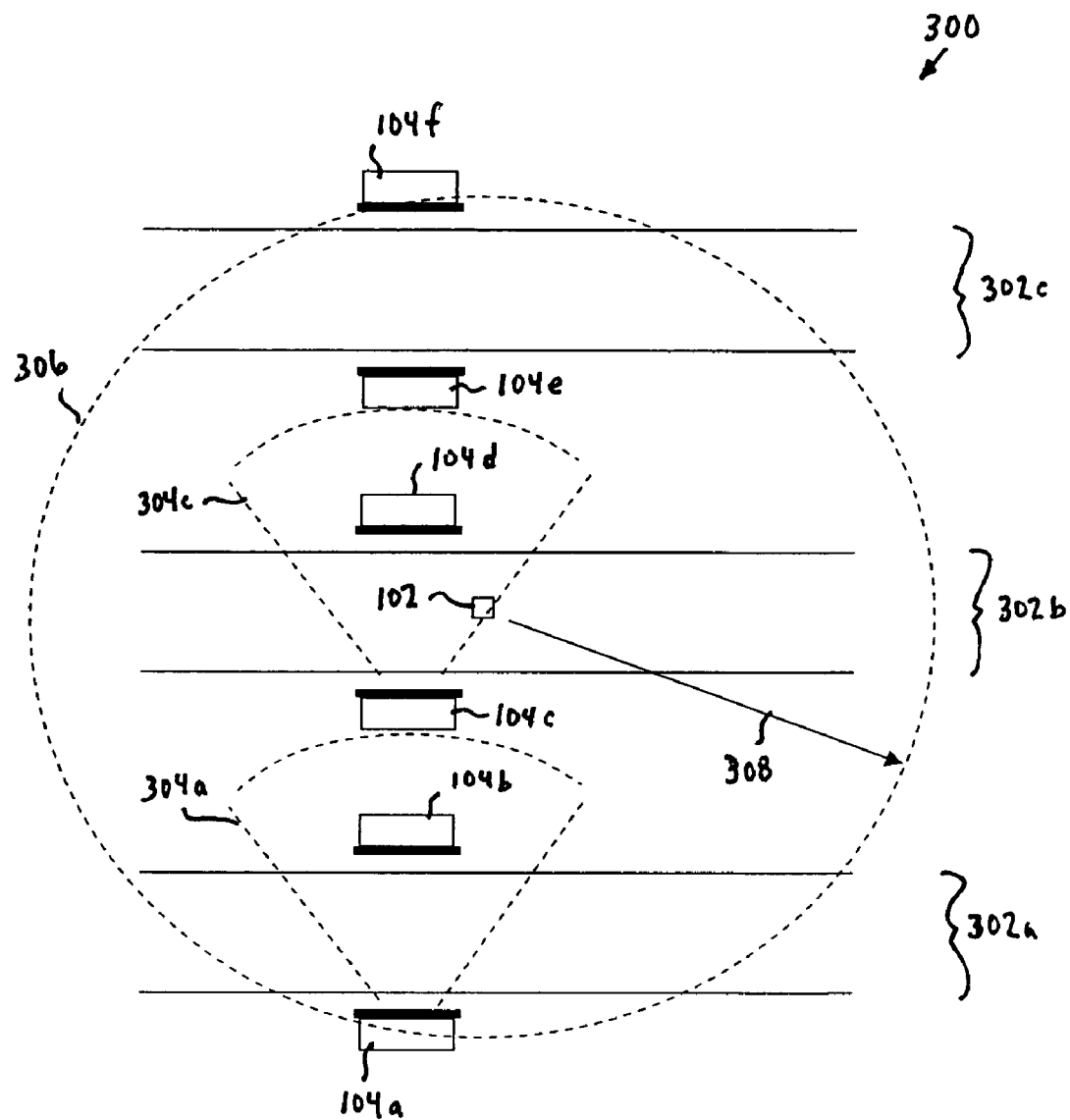
FIG. 3 shows a reader environment, where cross-reads of tags may occur.

For example, FIG. 3 shows an RFID environment 300, where a plurality of readers 104*a*-104*f* are positioned to read RFID tags located in environment 300. For example, tags may be attached to objects that move in and out of environment 300. In environment 300, readers 104*a* and 104*b* are oppositely positioned to cover a first zone 302*a*, readers 104*c* and 104*d* are oppositely positioned to cover a second zone 302*b*, and readers 104*e* and 104*f* are oppositely positioned to cover a third zone 302*c*. Zones 302*a*-302*c* can be aisles, conveyor belts, or other types of zones desired to be covered by readers.

FIG. 3 shows a transmitter domain 304*a* for reader 104*a* and a transmitter domain 304*c* for reader 104*c*. A transmitter domain 304 is a region that a transmitter of the respective reader 104 can power passive tags with a radiated RF power signal. As shown in FIG. 3, a tag 102 is within transmitter domain 304*c*, and thus receives a RF power signal transmitted by reader 104*c* to power tag 102. However, tag 102 is not within transmitter domain 304*a* of reader 104*a*, and thus is not powered by a RF power signal transmitted by reader 104*a*.

Thus, when reader 104*c* transmits a RF power signal, tag 102 will be powered up, and will be ready to be singulated. Singulation is a process by which a unique tag is isolated from a population of tags, and is an essential process of many if not all RFID communication protocols, as would be understood by persons skilled in the relevant art(s).

However, reader 104*a* may be operating roughly in synchronization with reader 104*c*. For example, reader 104*a* may transmit a RF power signal roughly at the same time as does reader 104*c*. Reader 104*a* may attempt to singulate its powered tags (if any) at the same time that reader 104*c* attempts to singulate its powered tags, including tag 102. Thus, readers 104*a* and 104*c* may synchronously transmit singulate commands to singulate their respective powered tags, even though this synchronous activity may be coincidental. Because of this, even though the signals of reader 104*a* are too weak to power tag 102, reader 104*a* may receive the response transmitted by tag 102 to respond to the singulate command transmitted by reader 104*c*.

For example, FIG. 3 shows a communication range 306 of tag 102. Communication range 306 is shown in FIG. 3 as a circle having a radius 308, although it can have other shapes. Tag 102 provides responses in a range indicated by communication range 306. In the example of FIG. 3, tag 102 responds to a singulate command received from reader 104*c* with a response that is receivable within communication range 306. Reader 104*c* is within communication range 306, and will receive the response from tag 102. As shown in FIG. 3, reader 104*a* is also within communication range 306. Thus, reader 104*a* may receive the response of tag 102 to the singulate command of reader 104*c*. Reader 104*a* may erroneously believe that the response of tag 102 is being provided in response to the singulate command transmitted by reader 104*a*. In this manner, reader 104*a* may erroneously cross-read tag 102, and thus tag 102 may be indicated as located in zone 302*a* by reader 104*a*. In fact, reader 104*a* may indicate that tag 102 is located in zone 304*a*, and reader 104*c* may indicate that tag 102 is located in zone 304*b*, because both reader 104*a* and reader 104c received the response of tag 102. This may lead to uncertainty over the actual location of tag 102.

Note that the same problem can occur if reader 104d is powering and singulating tag 102 instead of reader 104c. Any of readers 104a-104f may experience a cross-read of tag 102 (due to a singulation attempt by a different reader), because readers 104a-104f are all within communication range 306 of tag 102. Although the probability of sensing the response of tag 102 shown in FIG. 3 for readers 104e and 104b is lower because their antennas are not directly facing the tag response, this probability can be increased if there is equipment or structures within and around communication range 306 having RF reflecting properties, which can reflect the tag response signal in the direction of the antennas of readers 104e and 104b. Hence, a multipath issue can exist that can provide a tag signal strong enough to be sensed by all readers in range 306.

Thus, transmitter domains 304 of readers 104a-104f are configured in FIG. 3 so that signals of readers 104a-104f do not reach outside of their respective designated one of zones 302a-302c. However, despite this, as indicated in the example of FIG. 3, the response of tag 102 from zone 302b may be powerful enough to be present in adjacent zones 302a and 302c, where it can be erroneously received by one or more of readers 104a, 104b, 104e, and 104f, that happen to be in synchronization with reader 104c.

According to embodiments of the present invention, readers are forced out of synchronization by a delayed read command provided after singulation of tags. For example, the delayed read command is transmitted after a delay time period following the singulation command, and is used to verify an identification number of the tag. In an embodiment, in an environment similar to environment 300 shown in FIG. 3, the delayed time period may be configured based on the zone of the reader, and may be unique for each zone. In this manner, readers in different zones that send out simultaneous RF power signals may be forced out of synchronization with each other, in a coordinated fashion.

In an embodiment, a reader is configured for a particular zone, and internally selects the delay time period for the read verify command. Hence, after a reader singulates a tag, it will not initially trust the singulation operation. Instead, the reader generates and transmits a delayed read command. If the delayed read command generates a tag response, the reader compares a tag identification number received in the response to a tag identification number received in response to the singulate command. If the identification numbers match, the reader has successfully identified the tag and avoided a cross read.

Figure 4:
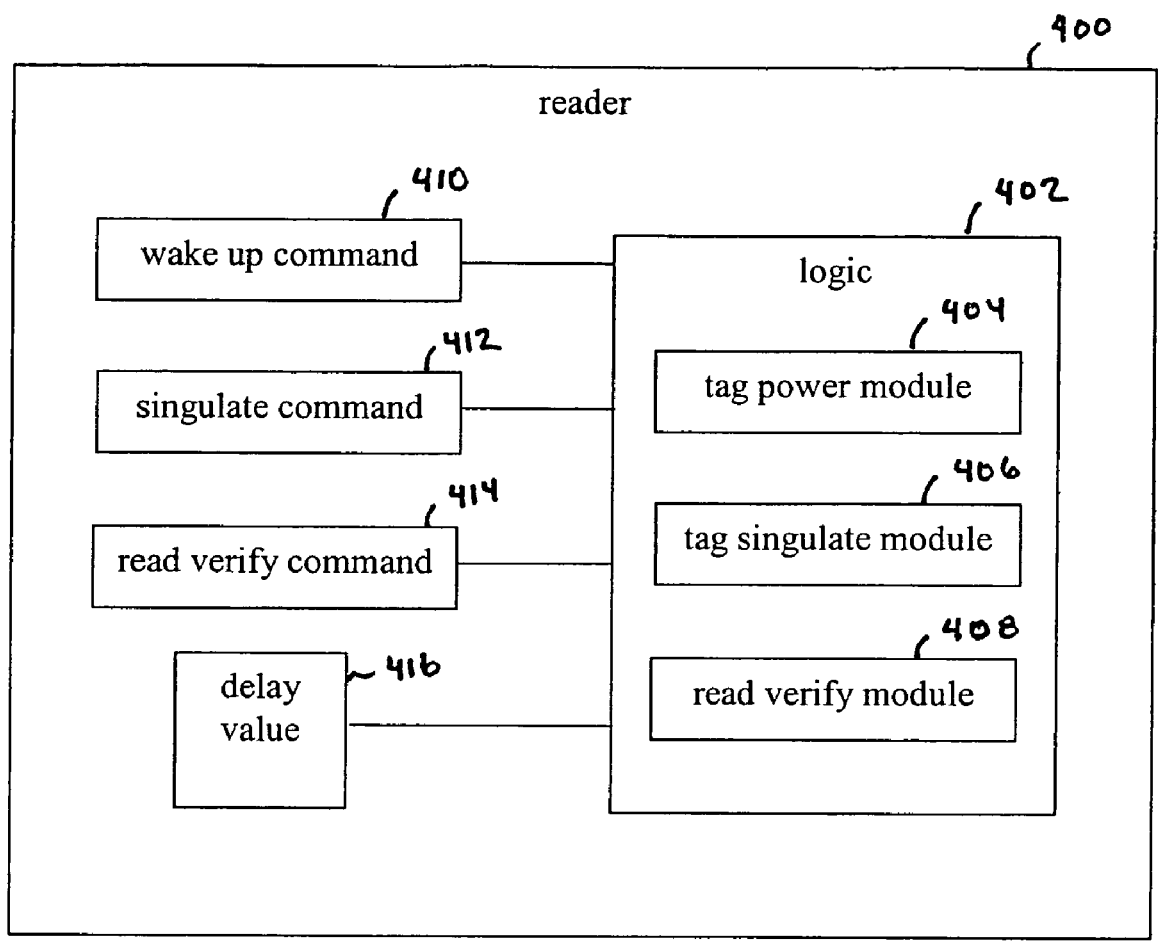
FIG. 4 shows a block diagram of a reader, according to an example embodiment of the present invention.

For instance, FIG. 4 shows an example reader 400, according to an embodiment of the present invention. Reader 400 can further include the elements of reader 104 shown in FIG. 2, or may be otherwise configured, for communicating with RFID tags. As shown in FIG. 4, reader 400 includes logic 402. In an embodiment, logic 402 may be implemented in a baseband processor of reader 400, such as baseband processor 212 shown in FIG. 2. Logic 402 may be implemented in hardware, software, firmware, or any combination thereof. Logic 402 includes a tag power module 404, a tag singulate module 406, and a read verify module 408.

As shown in FIG. 4, reader 400 further includes an optional wake up command 410, a singulate command 412, a read verify command 414, and a delay value 416, which may present in memory and/or storage of reader 400. Wake up command 410, when present, is accessible by tag power module 404. Singulate command 412 is accessible by tag singulate module 406. Read verify command 414 is accessible by read verify module 408. Delay value 416 is coupled to logic 402.

Tag power module 404 is configured to provide power to the one or more tags. Tag power module 404 causes reader 400 to transmit a radio frequency (RF) signal from an antenna of reader 400, such as antenna 202 shown in FIG. 2. The RF signal provides power to one or more tags within a power communication range of the antenna. Tag power module 404 may be logic conventionally present in RFID readers to enable a reader to power nearby tags, or may be special purpose logic for a particular application.

For example, in an EPC Gen 2 RFID communications environment, tag power module 404 may be configured to generate an RF signal that energizes one or more nearby tags (e.g., tags located in a transmitter domain of the reader), and causes the tags to enter a Ready state. In an embodiment, tag power module 404 is configured to transmit wake up command 410 to the one or more tags, if a wake up command is required by the particular RFID communication protocol to prepare the tags for a singulate command.

Tag singulate module 406 is configured to transmit singulate command (which may include a string of commands) from the antenna of reader 400 to singulate a powered tag. For example, tag singulate module 406 causes reader 400 to transmit singulate command 412, to singulate one or more tags within communication range of reader 400, such as tag 102 of FIG. 3. Tag singulate module 406 may be logic conventionally present in RFID readers to enable a reader to singulate tags, or may be special purpose logic for a particular application. Tag singulate command 412 may be directed to a particular tag, such as tag 102, or may be directed to all powered tags.

For example, the environment may be a slotted Aloha type communications environment, such as an EPC Gen 2 RFID communications environment, where tags are assigned time slots in which they are designated to respond to reader requests. Tag singulate module 406 may be configured to singulate tags according to the EPC Gen 2 RFID protocol. In such an embodiment, tag singulate module 406 may generate one or more Query commands (e.g., Query, QueryRep, QueryAdjust), to transition tag 102 to an Arbitrate state, and to cause tag 102 to respond with its identification number when its time slot is reached. In this manner, tag 102 is singulated. For further detailed description of the EPC Gen 2 protocol, refer to "EPC™ Radio-Frequency Identity Protocols Class-1 Generation-2 UHF RFID Protocol for Communications at 860 MHz-960 MHz," Version 1.0.9, and published 2004, which is incorporated by reference herein in its entirety.

Alternatively, the environment may be a binary traversal type communications environment, such as a Class 0 RFID communications environment, where a reader undergoes a bit-by-bit exchange (i.e., a binary traversal) with the tag population, to read each tag. Thus, tag singulate module 406 may be configured to singulate tags according to the Class 0 RFID protocol. In such an embodiment, tag singulate module 406 may generate a command to transfer tag 102 and other tags of a tag population to a tree traversal state, and may perform a bit-by-bit exchange with the tags to obtain identification numbers from the tags, thereby singulating the tags, including tag 102. For further detailed description of the Class 0 protocol, refer to "Technical Report, 860 MHz-930 MHz Class 0 Radio Frequency Identification Tag Protocol Specification Candidate Recommendation, Version 1.0.0," Auto-ID Center, Massachusetts Institute of Technology, Copyright 2003, published Jun. 1, 2003, which is incorporated by reference herein in its entirety.

Read verify module 408 is configured to transmit a read verify command (which may include a string of commands) to the singulated tag after a delay time period. For example, read verify module 408 causes reader 400 to transmit read verify command 414, after a delay time period of delay value 416. In response to read verify command 414, the tag, such as tag 102, provides identifying information to reader 400, such as the identification number of the tag.

For example, read verify command 414 may be formatted and transmitted according to any RFID communications protocol mentioned herein or otherwise known, including EPC Gen 2 and Class 0. In an EPC Gen 2 embodiment, for example, read verify command 414 can be configured to include a Read access command and/or other EPC Gen 2 commands to read the identification number of tag 102 after the singulation process is done. Alternatively, a Custom command under EPC Gen 2 can be configured to read the identification number of tag 102.

In a Class 0 environment, read verify command 414 can be configured as a specific read command of tag 102, where an identification number for tag 102 determined by tag singulate module 406 is used to interrogate tag 102, to determine the presence of tag 102. Alternatively, a binary traversal can again be performed on the tag population, to determine whether tag 102 is present and to determine its identification number.

In another Class 0 embodiment, the timing of bits transmitted during singulation processes by the various readers in each relevant zone can be configured differently (e.g., the transmitted bits can be shifted in time relative to each other by a known amount, from zone to zone, to be slightly offset). Thus, in such an embodiment, the singulation process places the readers out synchronization immediately, and therefore no read verify command.

Delay value 416 may be a permanent delay time period that is programmed or hard-encoded into reader 400. Alternatively, delay value 416 may be a non-permanent, reprogrammable delay time period. In an embodiment, delay value 416 is randomly generated, such as by a random number generator of reader 400. In another embodiment, delay value 416 is assigned based on an environment of reader 400. For example, in an environment similar to environment 300 of FIG. 3, where readers 104 are assigned zones, delay values 416 may be assigned among readers 104 to ensure that readers 104 in different zones that send out simultaneous powering signals are forced out of sync. Delay value 416 may be any time period, including a time in the millisecond time range, micro-second time range (e.g., 50 microseconds), etc.

Read verify module 408 is further configured to verify that a response received to read verify command 414 was received from the singulated tag. For example, in an embodiment, read verify module 408 compares a first identification number received from a tag in response to singulate command 402 with a second identification number received from a tag in response to read verify command 414. If the first and second identification numbers match, the singulated tag is verified. If the identification numbers do not match, the singulated tag is not verified.

Figure 5:
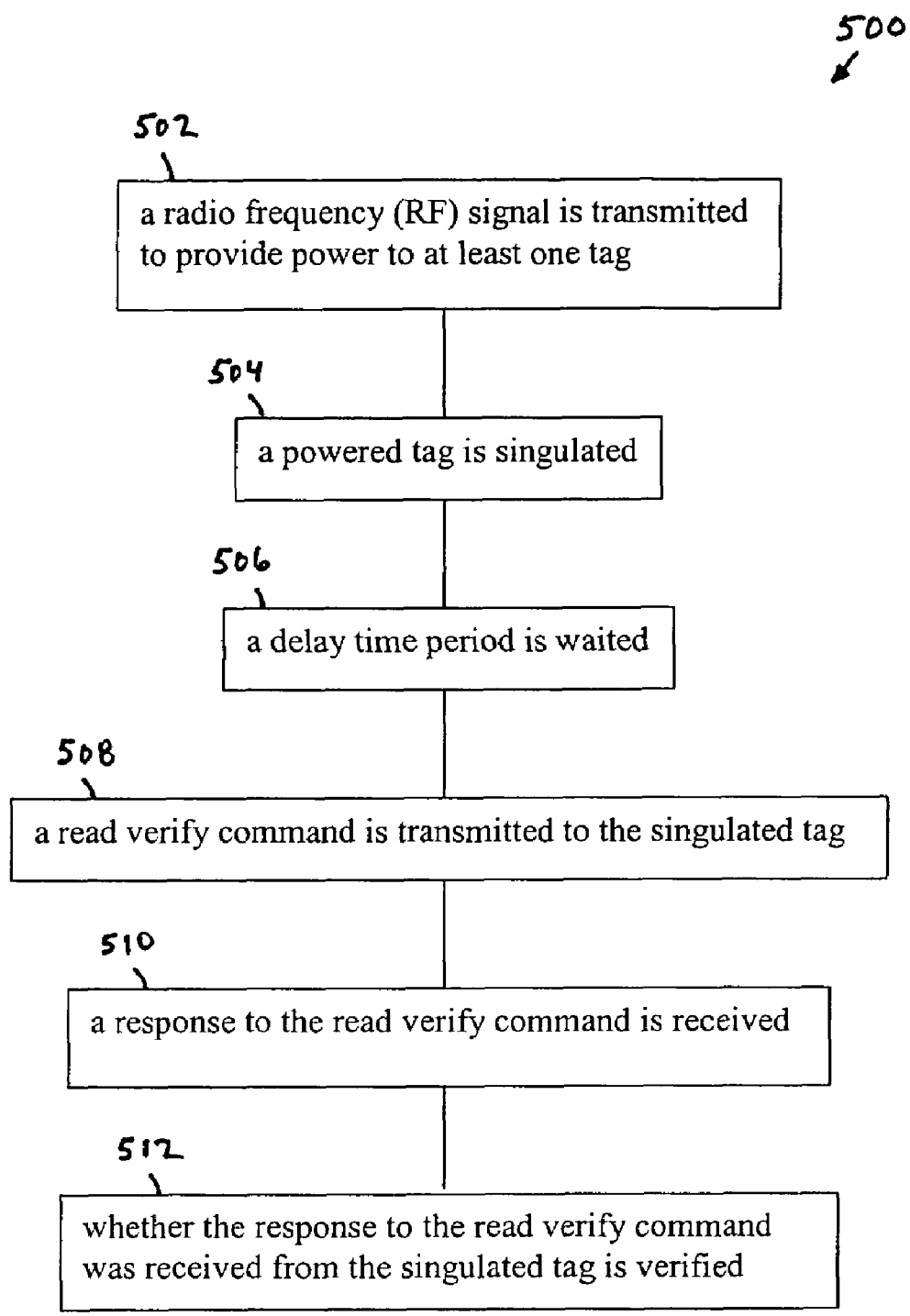
FIG. 5 shows a flowchart for a reader to singulate tags, according to an example embodiment of the present invention.

FIG. 5 shows a flowchart 500 of a process for a reader to verify singulated tags, according to an example embodiment of the present invention. The steps of flowchart 500 may be performed by a reader similar to reader 400 and/or alternative or additional readers. Other structural and operational embodiments will be apparent to persons skilled in the relevant art(s) based on the following discussion. Furthermore, the steps of flowchart 500 do not necessarily have to occur in the order shown in FIG. 5.

For illustrative purposes, flowchart 500 is described below with respect to an RFID environment 600 shown in FIGS. 6-10, which is similar to RFID environment 300 of FIG. 300. As shown in FIGS. 6-10, environment 600 includes a plurality of readers 602a-602f positioned to read RFID tags. Readers 602a and 602b are oppositely positioned to cover first zone 302a, readers 602c and 602d are oppositely positioned to cover second zone 302b, and readers 602e and 602f are oppositely positioned to cover third zone 302c. A tag 102 is located in zone 302b. Readers 602a and 602c each have functionality to verify singulated tags, according to an embodiment of the present invention.

Flowchart 500 begins with step 502. In step 502, a radio frequency (RF) signal is transmitted to provide power to at least one tag. For example, in an embodiment, tag power module 404 of FIG. 4 is configured to transmit power to the one or more tags. The RF signal provides power to one or more tags within a power signal communication range of the antenna.

Figure 6:
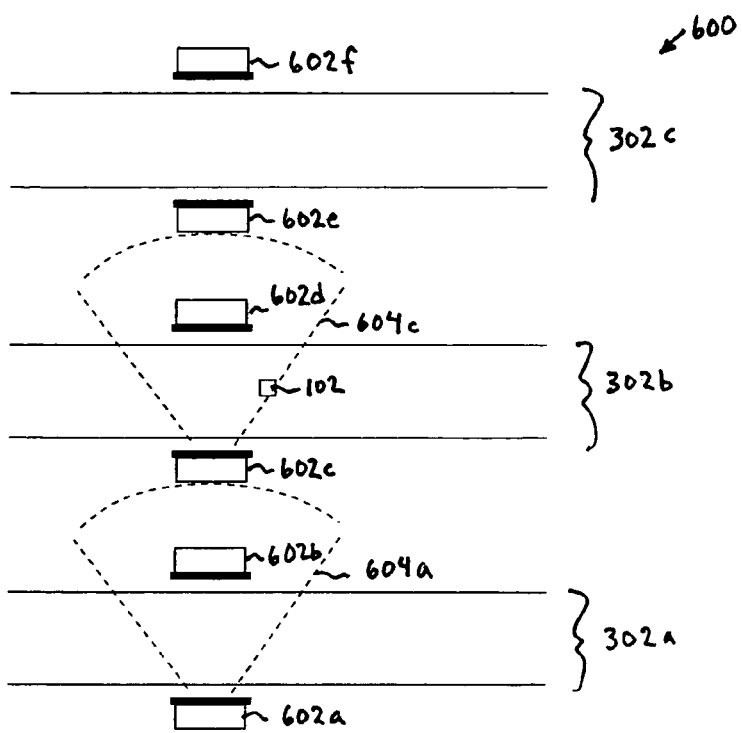
FIGS. 6-10 shows views of an example reader environment implementing an embodiment of the present invention.

For instance, FIG. 6 shows reader 602c transmitting a RF power signal 604c to provide power to one or more tags. Tag 102 receives RF power signal 604c and is thereby powered. Furthermore, reader 602a transmits a RF power signal 604a, which is not received by tag 102.

In step 504, a powered tag is singulated. For example, in an embodiment, the powered tag is singulated by tag singulate module 406 of FIG. 4. Tag singulate module 406 causes reader 400 to transmit singulate command 412, to singulate one or more tags within communication range of a reader.

Figure 7:
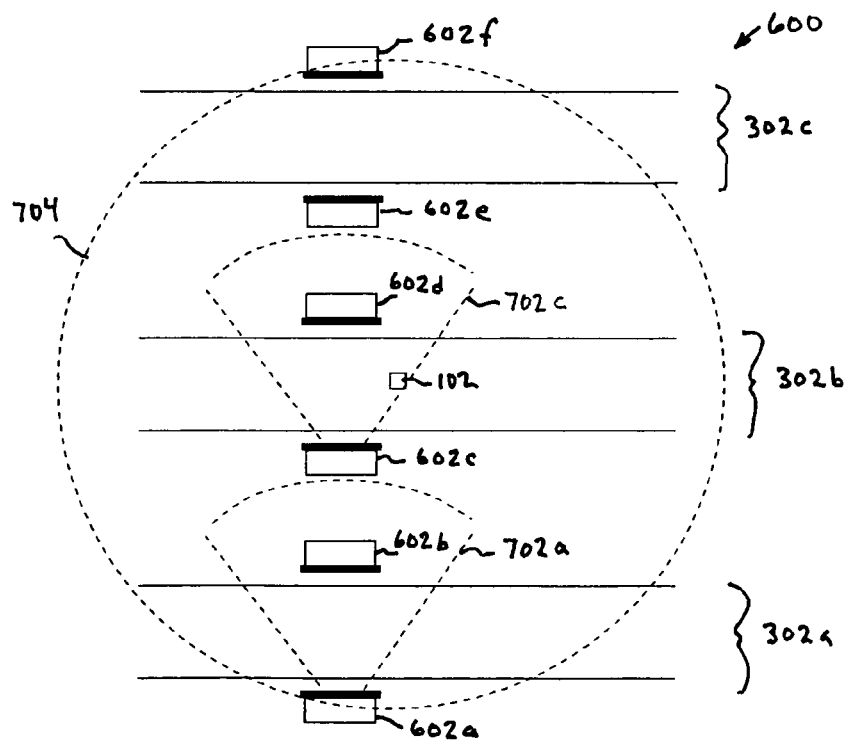

For instance, FIG. 7 shows reader 602c transmitting singulate command 412 in a first RF communications signal 702c. Tag 102 receives singulate command 412, and transmits a response signal 704. Response signal 704 may include an identification number for tag 102, and/or other identifying information for tag 102. As shown in FIG. 7, reader 602a transmits singulate command 412 in a second RF communications signal 702a that is not received by tag 102. Both of readers 602a and 602c receive response signal 704 from tag 102.

Figure 8:
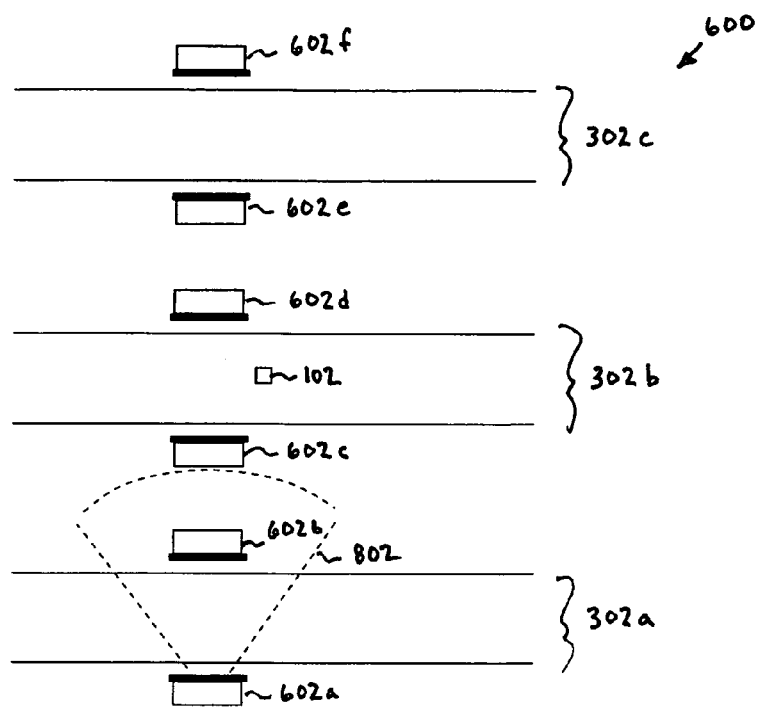

In step 506, a delay time period is waited. For example, as shown in FIG. 8, reader 602c waits a delay time period according to stored delay value 416. However, as shown in FIG. 8, in an embodiment, reader 602a stores a different delay value (including possibly a zero delay value) than reader 602c, so reader 602a transmits read verify command 414 in a third RF communications signal 802 while reader 602c is waiting. As shown in FIG. 8, third RF communications signal 802 does not reach tag 102.

Figure 9:
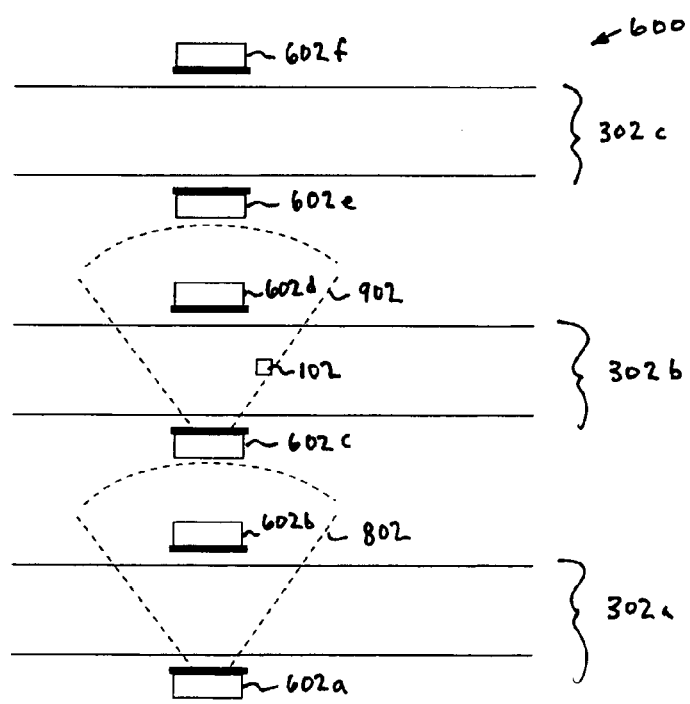

In step 508, a read verify command is transmitted to the singulated tag. For example, in an embodiment, read verify command 414 is caused to be transmitted by read verify module 408 of reader 602c. As shown in FIG. 9, reader 602c transmits read verify command 414 in a fourth RF communications signal 902. Depending on a delay value (if any) stored by reader 602a, reader 602a may still be transmitting third RF communications signal 802 when reader 602c begins transmitting read verify command 414. Alternatively, third RF communications signal 802 may be complete before reader 602c transmits fourth RF communications signal 902. In either event, the delay time period of step 506 is configured such that third RF communications signal 802 is completed being transmitted by reader 602a without receiving a response from tag 102.

Figure 10:
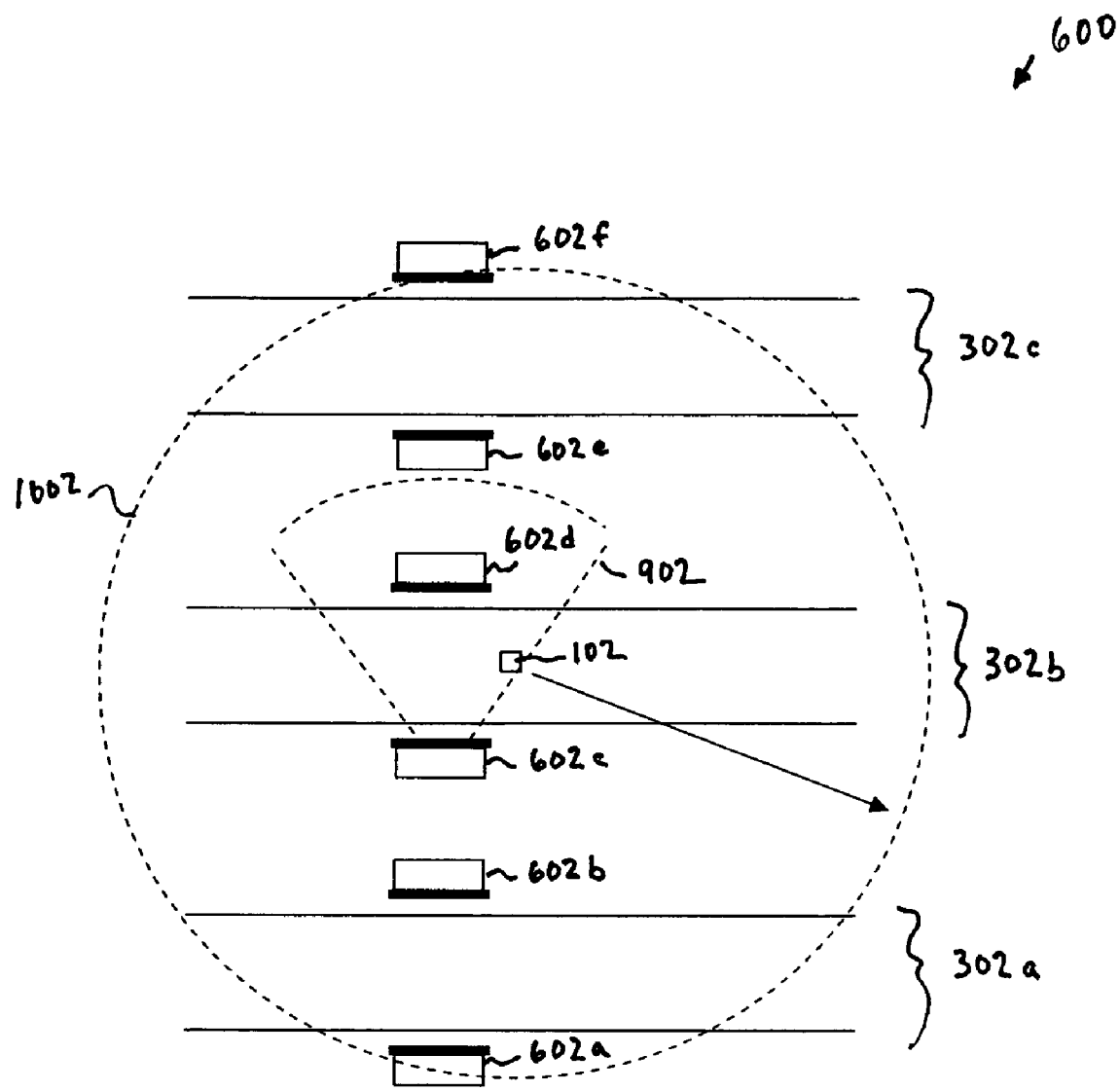

In step 510, a response to the read verify command is received. For example, as shown in FIG. 10, reader 602c continues to transmit fourth RF communications signal 902. Furthermore, tag 102 transmits a response signal 1002 to respond to fourth RF communications signal 902. Response signal 1002 is received by reader 602c, as reader 602c is listening for a response to fourth RF communications signal 902. Even though response signal 1002 reaches reader 602a, reader 602a does not receive response signal 1002 because reader 602a is not expecting a response at that time (i.e., third RF communications signal 802 had already completed).

In step 512, whether the response to the read verify command was received from the singulated tag is verified. For example, in an embodiment, read verify module 408 verifies whether a response received to read verify command 414 in step 510 is received from a tag singulated in step 504. In an embodiment, read verify module 414 performs step 512 by determining whether the identification number received from the singulated tag in step 504 matches an identification number received in step 510.

Thus, in an example EPC Gen 2 protocol embodiment, the identification number received from tag 102 during singulation in step 504 can be compared to an identification number received during verify in step 510. In an example Class 0 embodiment, where step 510 is performed using a specific read, step 512 can include verifying a tag was read during step 510 using an identification number determined during singulation in step 504. Step 512 can alternatively be performed in other manners according to EPC Gen 2, Class 0, and other protocols, as would be understood by persons skilled in the relevant arts(s) from the teachings herein.

FIG. 11 shows example further verification steps that may be performed, in embodiments.

In step 1102, the tag singulated in step 504 is disregarded by the reader if an identification number (or other identifying information) received from the singulated tag in step 504 does not match an identification number (or other identifying information) received in step 510. With regard to reader 602a, because response signal 704 is received from tag 102 during singulation of tag 102, but a correct response is not received from tag 102 to read verify command 414 transmitted by reader 602a in third RF communication signal 802, tag 102 is not verified by reader 602a. Thus, reader 602a determines tag 102 as not being read and/or not being present in zone 302a, and reader 602a avoids a cross-read event.

In step 1104, the tag singulated in step 504 is accepted by the reader if an identification number (or other identifying information) received from the singulated tag in step 504 matches an identification number (or other identifying information) received in step 510. For instance, with regard to reader 602c, an identification number received from tag 102 in response signal 704 (step 504) matches an identification number received in response signal 1002 (step 510). Thus, tag 102 is accepted by reader 602c, and reader 602c assumes that tag 102 is present in zone 302b.

Note that in the above example, the delay time period of reader 602c is greater than a delay time period of reader 602a. This is indicated in FIGS. 8 and 9, where reader 602a transmits third RF communications signal 802 before reader 602c transmits fourth RF communications signal 902. In another embodiment, a delay time period of reader 602c may be less than a delay time period of reader 602a. Thus, in such an embodiment, reader 602c may transmit fourth RF communications signal 902 before reader 602a begins transmitting third RF communications signal 802. In such an embodiment, the delay time period of reader 602c would be configured such that response signal 1002 is received from tag 102 by reader 602c before reader 602a expects a response to third RF communications signal 802. In this manner, reader 602c can still verify tag 102, and reader 602a will not suffer a cross read of tag 102.

Thus, embodiments of the present invention overcome cross reads of tags. As described above, during the singulation process of an RFID protocol, neighboring readers (e.g., readers 602a and 602c) may become synchronized even though they are independently running the RFID protocol. In such a situation, the tag singulation process is not enough in itself to avoid cross reads, to guarantee unique tag identification. Thus, according to embodiments, a delayed read command (e.g., read verify command 414) is used to verify a tag after initial singulation. The time delay before transmitting the delayed read command helps to move neighboring readers out of synchronization with the reader transmitting the command. In time critical applications, a tag may move out of the reader zone (e.g., zone 302b) before the assigned reader can re-start the whole singulation process to attempt a new read for a questionable tag. Thus, it is important to have functionality to verify the tag, as described herein, soon after the tag is singulated, rather than having to re-execute the singulation process anew, as in conventional RFID systems.

Also, note that the if a particular RFID application calls for more than three zones, the zone id can be recycled (and therefore the delay values), beginning with the zone where the tag signal cannot be detected by its readers. By recycling the delay values, the number of choices required for the delay parameter are kept to a minimum.

Example Computer System Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system (e.g., a reader) using a removable storage drive, hard drive, or communications interface. The control logic (software), when executed by a processor, causes the processor to perform the functions of the invention as described herein.

According to an example embodiment, a reader may execute computer-readable instructions to cause powering of tags, to cause transmission of a singulation command, to cause transmission of a read verify command, to perform verification of the tag and/or to perform other functions, as further described elsewhere herein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for reading a tag, comprising:
   (a) transmitting a radio frequency (RF) signal to provide power to at least one tag;

(b) singulating a powered tag;
(c) waiting a delay time period;
(d) transmitting a read verify command to the singulated tag;
(e) receiving a response to the read verify command; and
(f) verifying that the response to the read verify command was received from the singulated tag.

2. The method of claim 1, wherein step (b) comprises:
transmitting at least one singulate command; and
receiving an identification number from the powered tag.

3. The method of claim 2, wherein step (f) comprises:
determining whether the identification number received from the singulated tag in step (b) matches an identification number received in step (e).

4. The method of claim 3, further comprising:
(g) disregarding the singulated tag if the identification number received from the singulated tag in step (b) does not match the identification number received in step (e).

5. The method of claim 3, further comprising:
(g) accepting the singulated tag if the identification number received from the singluated tag in step (b) matches the identification number received in step (e).

6. The method of claim 1, wherein step (a) comprises:
transmitting an optional wake up command to the at least one tag.

7. The method of claim 2, wherein step (b) comprises:
formatting the singulate command according to an EPC Gen 2 communications protocol.

8. The method of claim 2, wherein step (b) comprises:
formatting the singulate command according to a binary traversal RFID communications protocol.

9. The method of claim 2, wherein step (b) comprises:
formatting the singulate command according to a slotted Aloha RFID communications protocol.

10. A system for reading a tag, comprising:
means for transmitting a radio frequency (RF) signal to provide power to at least one tag;
means for singulating a powered tag;
means for waiting a delay time period;
means for transmitting a read verify command to the singulated tag;
means for receiving a response to the read verify command; and
means for verifying that the response to the read verify command was received from the singulated tag.

11. A radio frequency identification (RFID) reader, comprising:
an antenna; and
logic that includes a tag power module, a tag singulate module, and a read verify module;
wherein the tag power module is configured to transmit a radio frequency (RF) signal from the antenna to provide power to at least one tag;
wherein the tag singulate module is configured to transmit a singulate command from the antenna to singulate a powered tag;
wherein the read verify module is configured to transmit a read verify command to the singulated tag after a delay time period; and
wherein the read verify module is further configured to verify that a response received to the read verify command was received from the singulated tag.

12. The reader of claim 11, wherein the tag singulate module is configured to receive a first identification number from the powered tag in response to the singulate command.

13. The reader of claim 12, wherein the read verify module is configured to determine whether the first identification number received from the singulated tag by the tag singulate module matches a second identification number received by the RFID reader in response to transmitting a read verify command to verify that the response was received from the singulated tag.

14. The reader of claim 13, wherein the singulated tag is disregarded by the reader if the first identification number does not match the second identification number.

15. The reader of claim 13, wherein the singulated tag is accepted by the reader if the first identification number matches the second identification number.

16. The reader of claim 11, wherein the tag power module is further configured to transmit a wake up command to the at least one tag.

17. The reader of claim 11, wherein the tag singulate module is singulate tags according to an EPC Gen 2 communications protocol.

18. The reader of claim 11, wherein the tag singulate module is configured singulate tags according to a binary traversal RFID communications protocol.

19. The reader of claim 11, wherein the tag singulate module is configured to singulate tags according to a slotted Aloha RFID communications protocol.

20. A method for a radio frequency identification (RFID) reader system, comprising:
(a) transmitting a radio frequency (RF) signal from a first reader to provide power to at least one tag;
(b) transmitting a first singulation command from the first reader;
(c) transmitting a second singulation command from a second reader;
(d) receiving an identification number from a tag powered by the RF signal at the first reader and the second reader in response to the first singulation command;
(e) transmitting a read verify command to the tag from the first reader after a delay time period;
(f) transmitting a read verify command to the tag from the second reader;
(g) receiving a response to the read verify command at the first reader; and
(h) verifying at the first reader that the response to the read verify command was received from the tag powered by the RF signal.

21. The method of claim 20, wherein step (h) comprises:
determining whether the identification number received from the tag in step (d) matches an identification number received in step (g).

22. The method of claim 21, further comprising:
(i) disregarding the tag if the identification number received from the tag in step (d) does not match the identification number received in step (g).

23. The method of claim 21, further comprising:
(i) accepting the tag if the identification number received from the tag in step (d) matches the identification number received in step (g).

* * * * *